(12) United States Patent
Allen et al.

(10) Patent No.: US 9,188,245 B2
(45) Date of Patent: Nov. 17, 2015

(54) FAIRING HAVING IMPROVED STABILITY

(71) Applicant: VIV Solutions LLC, Richmond, TX (US)

(72) Inventors: Donald Wayne Allen, Richmond, TX (US); Dean Leroy Henning, Richmond, TX (US); William Andrew West, Friendswood, TX (US); Philip Albert Larson, La Mirada, CA (US)

(73) Assignee: VIV Solutions LLC, Richmond, TX (US)

( * ) Notice: Subject to any disclaimer, the term of this patent is extended or adjusted under 35 U.S.C. 154(b) by 0 days.

(21) Appl. No.: 14/703,078

(22) Filed: May 4, 2015

(65) Prior Publication Data

US 2015/0233494 A1 Aug. 20, 2015

Related U.S. Application Data

(62) Division of application No. 13/338,747, filed on Dec. 28, 2011, now Pat. No. 9,022,075.

(60) Provisional application No. 61/429,082, filed on Dec. 31, 2010, provisional application No. 61/439,935, filed on Feb. 7, 2011.

(51) Int. Cl.
| | | |
|---|---|---|
| *F16L 1/15* | (2006.01) | |
| *F16L 3/00* | (2006.01) | |
| *B29C 47/00* | (2006.01) | |
| *B29C 39/08* | (2006.01) | |
| *B29L 31/00* | (2006.01) | |

(52) U.S. Cl.
CPC . *F16L 1/15* (2013.01); *B29C 39/08* (2013.01); *B29C 47/003* (2013.01); *B29L 2031/772* (2013.01)

(58) Field of Classification Search
CPC .................................... F16L 3/00; F16L 1/15
USPC ................... 138/106–108; 405/216; 114/243
See application file for complete search history.

(56) References Cited

U.S. PATENT DOCUMENTS

| | | |
|---|---|---|
| 4,078,605 A | 3/1978 | Jones |
| 4,171,674 A | 10/1979 | Hale |
| 4,398,487 A | 8/1983 | Ortloff et al. |
| 4,474,129 A | 10/1984 | Watkins et al. |
| 6,167,915 B1 * | 1/2001 | Collie .................. E21B 17/206 138/108 |
| 7,380,513 B2 | 6/2008 | Lie |
| 8,500,367 B2 | 8/2013 | Somerville et al. |
| 8,523,492 B2 | 9/2013 | Baugh |
| 2007/0215028 A1 | 9/2007 | Lie |
| 2010/0061809 A1 | 3/2010 | Allen et al. |
| 2010/0071797 A1 * | 3/2010 | Jungers ......................... 138/141 |

FOREIGN PATENT DOCUMENTS

WO   WO-2008064102   5/2008

* cited by examiner

*Primary Examiner* — Patrick F Brinson
(74) *Attorney, Agent, or Firm* — Blakely Sokoloff Taylor & Zafman LLP

(57) ABSTRACT

An apparatus including a fairing operable to suppress a vortex-induced vibration of a tubular, the fairing having a body portion and a tail portion that tapers from the body portion to an end portion, the body portion defining an annulus dimensioned to encircle a tubular. The apparatus further including a stabilizing member positioned along the body portion, the stabilizing member being dimensioned to stabilize the fairing along a tubular positioned within the annulus.

10 Claims, 16 Drawing Sheets

FAIRING HAVING IMPROVED STABILITY

CROSS-REFERENCE TO RELATED APPLICATIONS

This application is divisional of co-pending U.S. patent application Ser. No. 13/338,747, filed Dec. 28, 2011, which application claims the benefit of the earlier filing date of U.S. Provisional Patent Application No. 61/429,082, filed Dec. 31, 2010 and U.S. Provisional Patent Application No. 61/439,935, filed Feb. 7, 2011, all of which are incorporated herein by reference.

FIELD

A vortex-inducted vibration (VIV) suppression device having improved performance and stability. Other embodiments are also described and claimed.

BACKGROUND OF THE INVENTION

A difficult obstacle associated with the exploration and production of oil and gas is management of significant ocean currents. These currents can produce VIV and/or large deflections of tubulars associated with drilling and production. VIV can cause substantial fatigue damage to the tubular or cause suspension of drilling due to increased deflections. Various types of VIV suppression devices, for example helical strakes and fairings, can be attached to the tubular in an effort to suppress the effects of VIV on the tubular. While helical strakes, if properly designed, can reduce the VIV fatigue damage rate of a tubular in an ocean current, they typically produce an increase in the drag on the tubular and hence an increase in deflection. Thus, helical strakes can be effective for solving the vibration problem at the expense of worsening the drag and deflection problem.

Another solution is to use fairings as the VIV suppression device. Typical fairings have a substantially triangular shape and work by streamlining the current flow past the tubular. A properly designed fairing can reduce both the VIV and the drag. Fairings can be made to be free to weathervane around the tubular in response to changes in the ocean current. Typically, fairings are applied to tubulars with a need for very low drag. Short fairings can be applied to a tubular to reduce both VIV and drag, but sometimes a further reduction of drag is required.

An option for achieving very low drag is to use longer fairings, i.e. fairings with longer chords. Longer chords help further streamline the flow in a more gradual fashion. There are several issues, however, associated with the use of long chord fairings. One issue is the need to keep the fairing aligned with the flow of water. While short fairings can reduce VIV substantially without fully aligning themselves with the flow, they experience an increase in drag if they do not align properly with the incoming flow. This increase in drag is even greater for longer chord fairings and, since longer chord fairings are selected mostly for their low drag characteristics, it is important that they align properly with the incoming flow.

A second issue associated with long chord fairings is the difficulty in quickly and securely installing these devices. Since they are larger, they are both more cumbersome to handle and will experience larger forces on them normal to the flow direction.

A third issue associated with long chord fairings is the cost of fabrication. Short fairings are typically more expensive than helical stakes, and long chord fairings are even more expensive. Thus, there is a concern that long chord fairings will be prohibitively expensive to use.

A fourth issue associated with long chord fairings is the tendency of long chord fairings to experience a plunge-torsional instability. This instability is also commonly known as flutter, and results in large motions of the tubular due to rotations of the fairings that are synchronized with the motion of the tubular.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION OF THE INVENTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

Figure 1A:
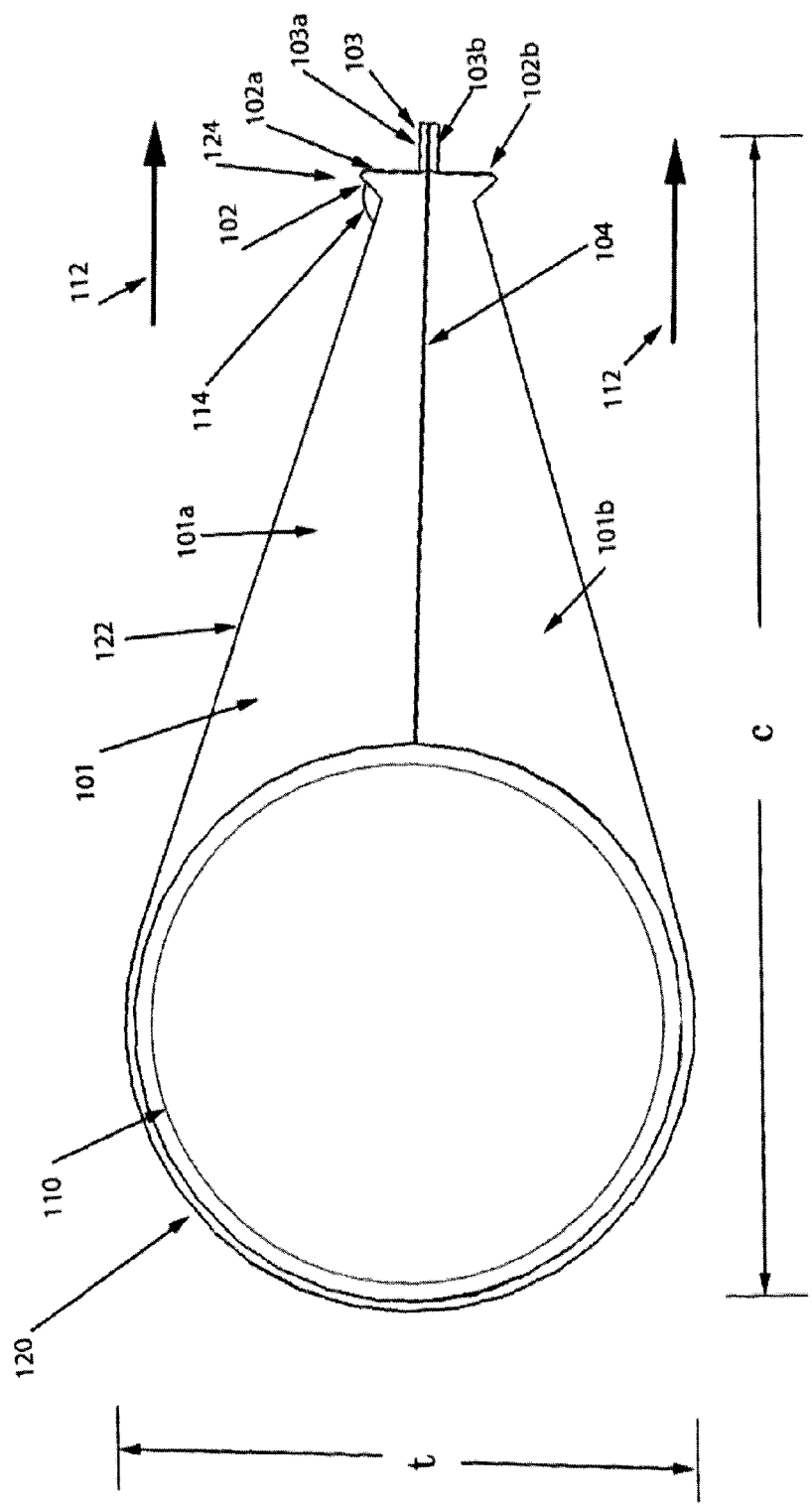
FIG. 1A illustrates a top view of an embodiment of a fairing.

FIG. 1A illustrates a top view of a fairing. Fairing 101 may be dimensioned to suppress VIV of an underlying structure or tubular 110. Fairing 101 may include a body portion 120 that encircles an underlying structure or tubular 110 and a tail portion 122 that tapers from body portion 120 to form a narrow end portion 124. Fairing 101 may be include first section 101A and second section 101B that can be separated along opening 104 so that fairing 101 can be positioned around underlying structure or tubular 110. Once fairing 101 is positioned around tubular 110, it is free to weathervane with changes of angle of the incoming current. In some embodiments, fairing 101 is a long chord fairing. The term "long chord" refers to a fairing having a chord to thickness ratio of greater than about 1.5, for example about 2.15. The chord (c) of a fairing is typically measured from the nose (left side in FIG. 1A) to the end portion 124 of fairing 101, in other words the chord (c) is equivalent to a length dimension of fairing 101. The thickness (t) of a fairing is the width of the fairing normal to the current flow, or approximately the diameter of the tubular plus twice the sum of the annulus and the fairing material thickness. Typical chord to thickness ratios for fairing 101 will range from about 1.5 to about 5.0, for example, from 1.7 to 3.0. Fairings with larger chord to thickness ratios typically have lower drag than fairings with shorter chord to thickness ratios.

Although long chord fairings help to reduce drag about tubular 110, they can be difficult to align with the incoming current flow and therefore experience instabilities in motion and performance. To improve the stability of fairing 101, fairing 101 may include stabilizer 102 and flange 103 at end 124. Stabilizer 102 may be configured to help keep fairing 101 aligned with current flow 112. Representatively, in FIG. 1A, current flow 112 is parallel, or nearly parallel, to an axis of fairing 101 along the chord dimension of fairing 101. Typically, tail portion 122 of fairing 101 tapers such that a thickness of fairing 101 is smallest at the end portion 124. Although the narrowness of the fairing tail provides for a streamlined structure, it also makes it more difficult for fairing 101 to stabilize itself with the changing current directions. In this aspect, stabilizer 102 may be any structure dimensioned to trip or catch current flow, in other words, a structure that protrudes outwardly from tail portion 122 and abruptly increases a thickness of the tapered end 124 of sections 101A, 101B, which in turn increases fairing stability. Representatively, stabilizer 102 may include a first triangular section 102A and a second triangular section 102B coupled to the end portion 124 of sections 101A and 101B respectively. Alternatively, stabilizer 102 may be a plate like structure or other protruding structure that can abruptly increase a thickness of tail portion 122 so that it catches the current. An angle 114 formed between fairing 101 and stabilizer 102 may be greater than 0 degrees. Representatively, stabilizer 102 can form an angle of between at least 10 degrees and 170 degrees from the fairing tail, for example, between 20 and 120 degrees from the fairing tail. In this aspect, a thickness of end portion 124 of fairing 101 may be increased by from about 10 percent to about 200 percent.

While stabilizer 102 is optional, stabilizer 102 helps fairing 101 more easily find a stable position that is at a relatively large angle from the incoming flow.

Flange 103 extends from stabilizer 102 of fairing 101 to further improve the effectiveness and stability of fairing 101. For example, in embodiments where fairing 101 includes first section 101A and second section 101B, flange 103 may include first flange 103A and second flange 103B extending from stabilizer sections 102A, 102B, respectively. Each of first flange 103A and second flange 103B may be elongated structures that improve fairing effectiveness and provide a surface for fastening fairing sections 101A and 101B together once they are placed around tubular 110. Any suitable fastening method can be used to fasten sections 103A, 103B of flange 103 together, such as nuts and bolts, screws, other mechanical fasteners, chemical bonding, welding, or a combination of these methods.

Still further, flange 103 can provide support for stabilizer fins, perforate plates, or other structures to increase the rotational damping of fairing 101. By increasing the rotational damping of fairing 101, the stability of fairing 101 is improved. When a series of fairings are on a tubular, the size, shape, and design of flange 103 can be varied from fairing to fairing to improve the overall fairing system performance (lower tubular vibration, lower drag, or improved stability). Not all fairings in a system will necessarily have flanges. Not all fairings in a system will necessarily have stabilizers.

In some embodiments, fairing 101, stabilizer 102 and flange 103 are integrally formed pieces that are formed together as a single unit. In one embodiment, fairing section 101A, stabilizer 102A and flange 103A are molded as one single integrally formed piece and fairing section 101B, stabilizer 102B and flange 103B are molded as another single integrally formed piece. In one embodiment for integrally forming these pieces, fairing 101 can be molded rotationally molded in an open position, which requires significant engineering. It is contemplated that various techniques may be used to form fairing 101, stabilizer 102 and flange 103 as a single unit, for example, an extrusion process or other suitable process such as an injection molding process, rotational molding process, vacuum forming process or other similar process. Forming fairing 101, stabilizer 102 and flange as a single molded unit significantly reduces cost and manufacturing time constraints. Alternatively, fairing 101 can be made with the optional stabilizer 102 and optional flange 103 in multiple pieces or sections so that components may be added, removed or exchanged as necessary. For example, the stabilizer can be made separately, the flange can be made separately, or parts of the main fairing body, such as section 101*a* and section 101*b*, can be made separately. Fairing 101, stabilizer 102, and flange 103 can be made of plastic, rubber, wood, fiberglass or other composite materials, metals, or any suitable material that allows it to maintain its approximate shape.

Figure 1B:
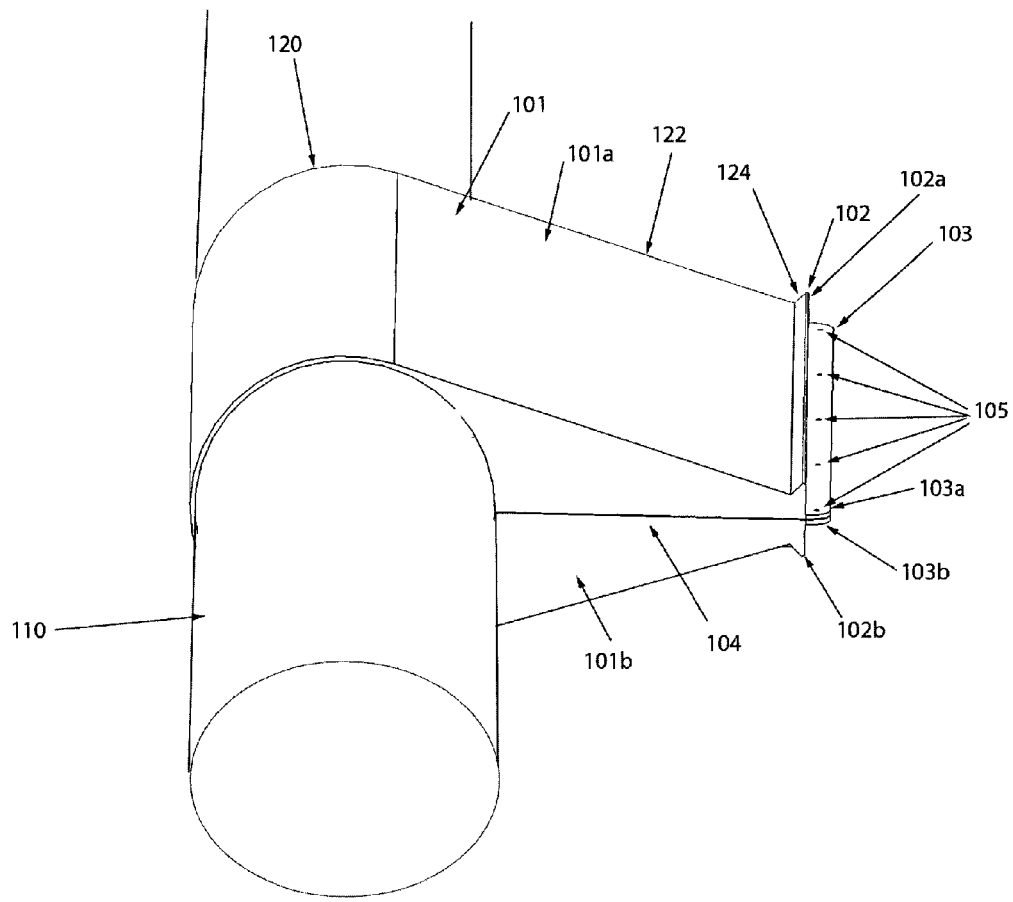
FIG. 1B illustrates a perspective view of the fairing illustrated in FIG. 1A.

FIG. 1B illustrates a perspective view of the fairing of FIG. 1A. From this view, it can be seen that flange 103 may include apertures 105 through which a fastener may be inserted to secure first fairing section 101A to second fairing section 101B. Apertures 105 may be molded into flange 103 or drilled after molding. Fairing 101 may also have additional support structures (such as internal blocks) or other appurtenances to optimize its structural integrity.

Figure 2A:
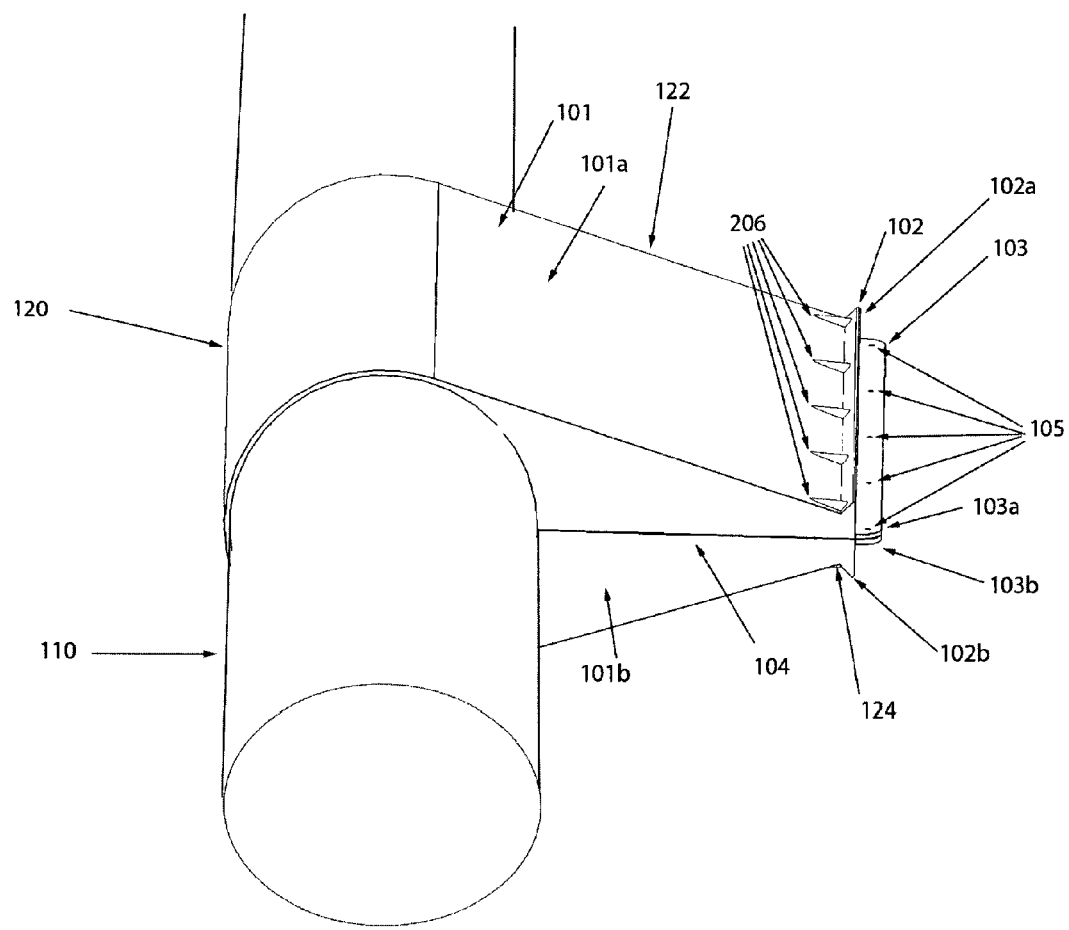
FIG. 2A illustrates a perspective view of another embodiment of a fairing.

FIG. 2A illustrates a perspective view of another embodiment of a fairing. Fairing 101, stabilizer 102 and flange 103 are substantially similar to the fairing, stabilizer and flange disclosed in reference to FIG. 1A and FIG. 1B except that in this embodiment, fairing 101 also includes an optional auxiliary stabilizing member in the form of fins 206 formed between each of fairing sections 101A, 101B and stabilizers 102A, 102B. Auxiliary fins 206 may be dimensioned to provide ease of molding the fairing and also restrict correlation of vortices along the fairing tail so that the vortices can be controlled by stabilizer 102. For example, auxiliary fins 206 may have a triangular shape that is complementary to angle 114 formed between stabilizer 102 and fairing 101. Auxiliary fins 206 can extend as high and as far along fairing 101 as desired. A height, length, number, and thickness of auxiliary fins 206 may vary depending upon the desired performance characteristics, fairing cost, and molding considerations. In addition, although auxiliary fins 206 are illustrated only along first section 101A of fairing 101, it is contemplated they may further be provided along section 101B. Auxiliary fins 206 may be formed with fairing 101, stabilizer 102 and flange 103 as a single integrally formed molded piece or separately formed and attached to fairing 101.

Figure 2B:
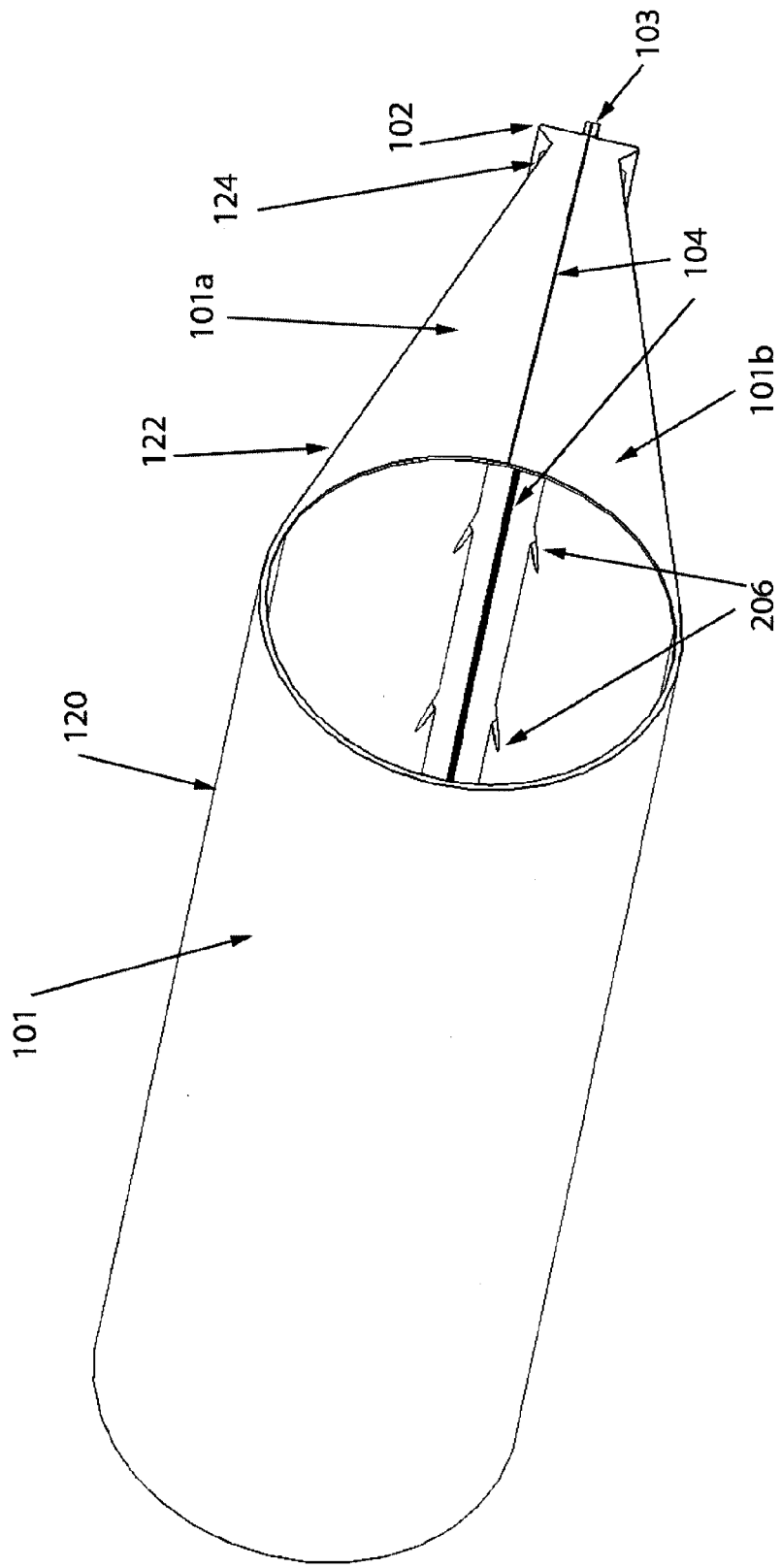
FIG. 2B illustrates a bottom perspective view of the fairing illustrated in FIG. 2A.

FIG. 2B illustrates a bottom perspective view of the fairing, stabilizer, flange and auxiliary flange illustrated in FIG. 2A. From this view it can be seen that auxiliary fins 206, when viewed from the inside of fairing 101, are depressions. In this aspect, a constant thickness of fairing 101 is maintained in this area where auxiliary fins 206 reside. Alternatively, auxiliary fins 206 may be formed separately from fairing 101 and attached the fairing surface such that the depressions are not necessary.

Figure 3:
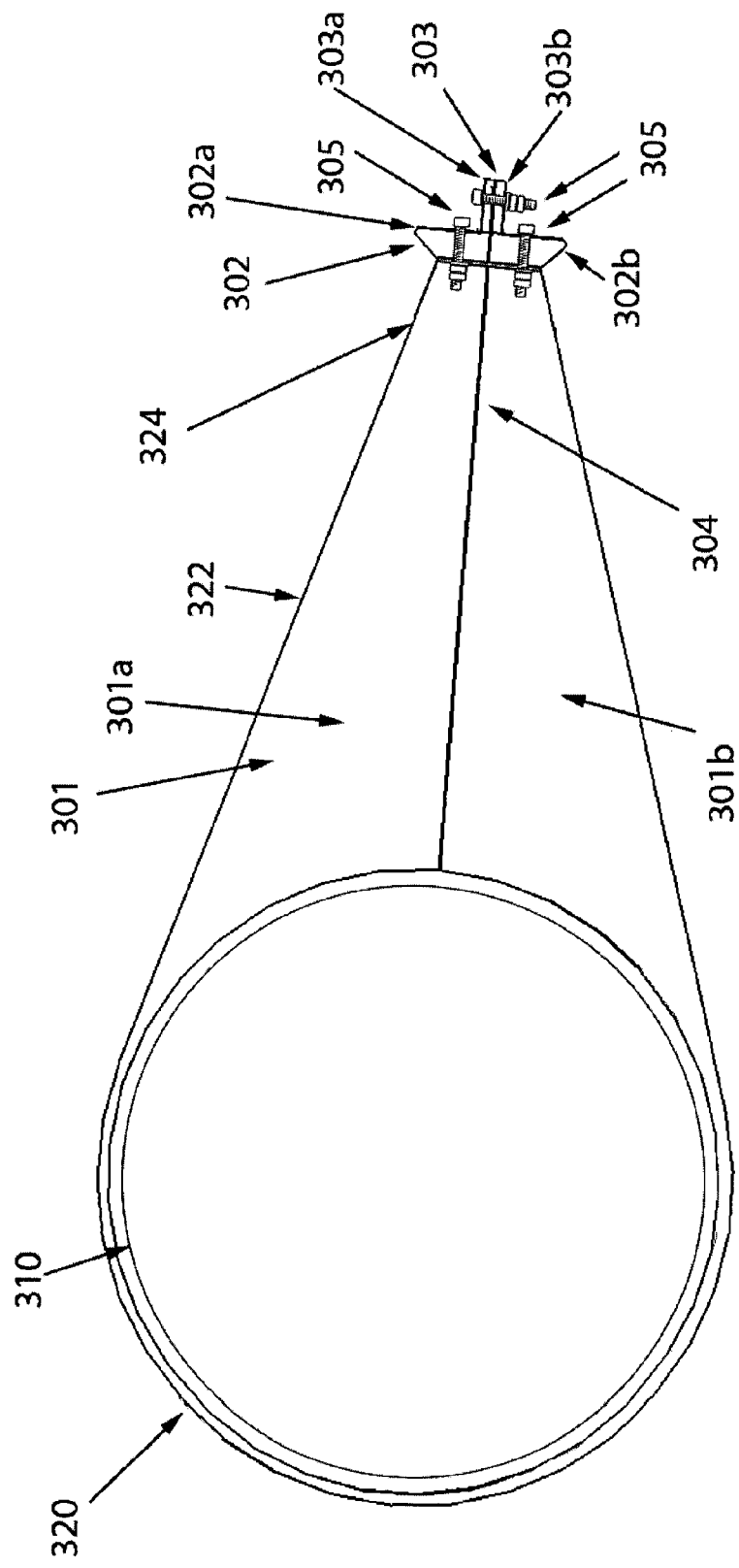
FIG. 3 illustrates a top view of another embodiment of a fairing.

FIG. 3 illustrates a top view of another embodiment of a fairing. Fairing 301, stabilizer 302 and flange 303 are substantially similar to fairing 101, stabilizer 102 and flange 103 previously discussed in reference to FIG. 1A except that in this embodiment, the components are separately formed and attached to one another (i.e. they are not all molded together as a single piece). In particular, fairing 301 includes body portion 320, tail portion 322 and end portion 324. Fairing 301 includes fairing first section 301a, stabilizer first section 302a and flange first section 303a, which are formed as separate pieces and then attached to one another, for example, by fasteners 305 (e.g. bolts or screws or other mechanical fastening means). Similarly, fairing second section 301b, stabilizer second section 302b and flange second section 303b are formed as separate pieces and then attached to one another, for example, by fasteners 305. Fairing first section 301a and second section 301b may be separated along opening 304 so that fairing 301 can be positioned around tubular 310 and then attached to one another along flange 303 using fasteners 305 or any other similar suitable attachment mechanism. Alternatively, flange 303 may be omitted and sections 301a, 301b attached to one another along, for example, stabilizer 302.

It is further contemplated, that some of the pieces may be formed together while others are formed separately and later attached to one another. For example, sections 302a and 302b of stabilizer 302 and sections 303a and 303b of flange 303, respectively, can be molded or made as a single piece and then cut before attaching them to fairing 201. Instead of, or in addition to fasteners 305, the components may be attached to each other by welding, chemical bonding, or any suitable means.

Fairing 301, stabilizer 302, and flange 303 can be made of plastic, rubber, wood, fiberglass or other composite materials, metals, or any suitable material that allows fairing 301 to maintain its approximate shape. Fasteners 305 may be made from metals such as Inconel or stainless steel, plastics, fiberglass or other composite materials, or any suitable material.

Figure 4:
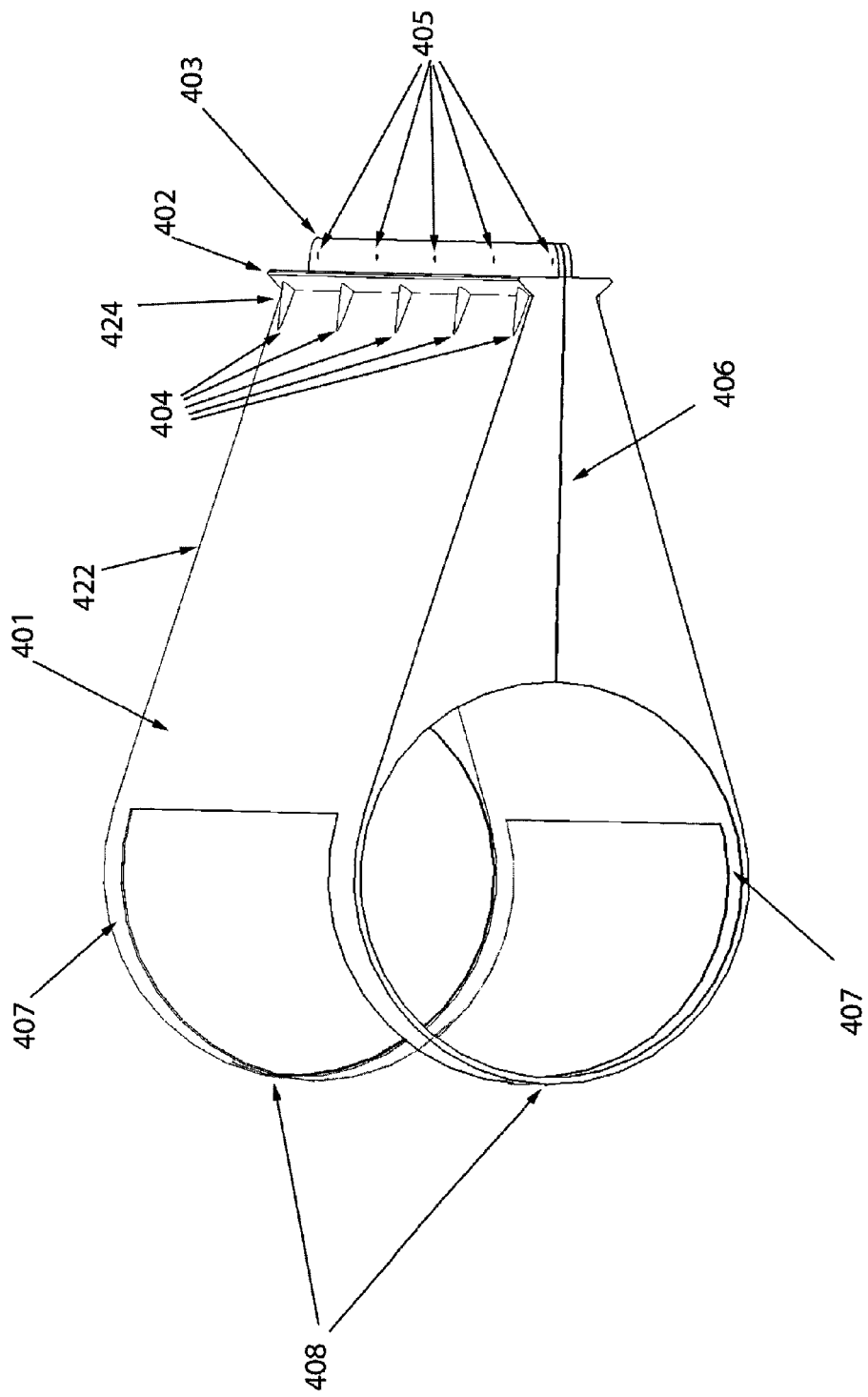
FIG. 4 illustrates a perspective view of another embodiment of a fairing.

FIG. 4 illustrates a perspective view of another embodiment of a fairing. Fairing 401, stabilizer 402 and flange 403 are substantially similar to fairing 101, stabilizer 102 and flange 103 described in reference to FIG. 1A except in this embodiment, fairing 401 includes straps 407 to facilitate securing of fairing 401 to an underlying tubular (not shown). In some embodiments, straps 407 attached to tail portion 422 of fairing 401 encircle the underlying tubular and a body portion of fairing 401 is omitted. Straps 407 may be cut from a body portion of fairing 401 such they are integrally formed with fairing 401 as a single unit. In other embodiments, as will be described in reference to FIG. 5, straps 407 may be built separately from fairing 401 and then attached (e.g., bolted) to fairing 401. Straps 407 may optionally have hinges at locations 408. Advantages of this embodiment are that a weight of fairing 401 is reduced and therefore fairing 401 is easier to install. Similar to the previously discussed embodiments, stabilizer 402 and flange 403 may be connected to end portion 424 of fairing 401 to improve fairing stability.

In some embodiments, straps 407 and fairing 401 have flanges around their edges on each end of the fairing (not shown, but one flange running around the circumference of the tail and/or strap on the near side of the fairing and another on the far side of the fairing) to upset any correlation of vortex shedding along fairing 401. Fairing 401 may be opened by using force on straps 407 to open the fairing or by hinges on straps 407 and locations 408 and placed around a structure or tubular and then secured by fastening both sides of flange 403 together. More or less than two straps 407 may be used.

Straps 407 may be attached to fairing 401 in any number of ways. Representatively, fairing 401 can be molded or made separate from straps 407 or fairing 401 and straps 407 can be molded as a single piece (with stabilizer 402 and/or flange 403 also optionally molded together with fairing 401 and/or straps 407 as a single piece). A second method is to mold a single piece fairing 401 and cut out material so that the straps 407 are part of fairing 401. Alternatively straps 407 can be made separate from fairing 401 and attached to fairing 401 by bolting, screwing or other suitable means, welding, chemical bonding, or any suitable means.

Again referring to FIG. 4, straps 407 will typically have an inside diameter that is equal to the structural or tubular diameter plus an annulus that allows fairing 401 to rotate freely around the structure or tubular. Straps 407 may be molded, extruded, rolled, or made by any means that allows them to maintain fairing 401 adjacent to the tubular. Hinges at hinge locations 408 may be any common hinge type that allows straps 407 to open with sufficient ease to place fairing 401 around the tubular.

Again referring to FIG. 4, all of the descriptions for FIG. 1A and FIG. 1B including features, sizes, materials, fastening methods, and other variations apply to FIG. 4. In addition, straps 407 may be made of any suitable material including metals, plastics, fiberglass and other composites, and wood. Hinges at hinge locations 408 may be made of any suitable material including metals, plastics, fiberglass and other composites, and wood.

Figure 5:
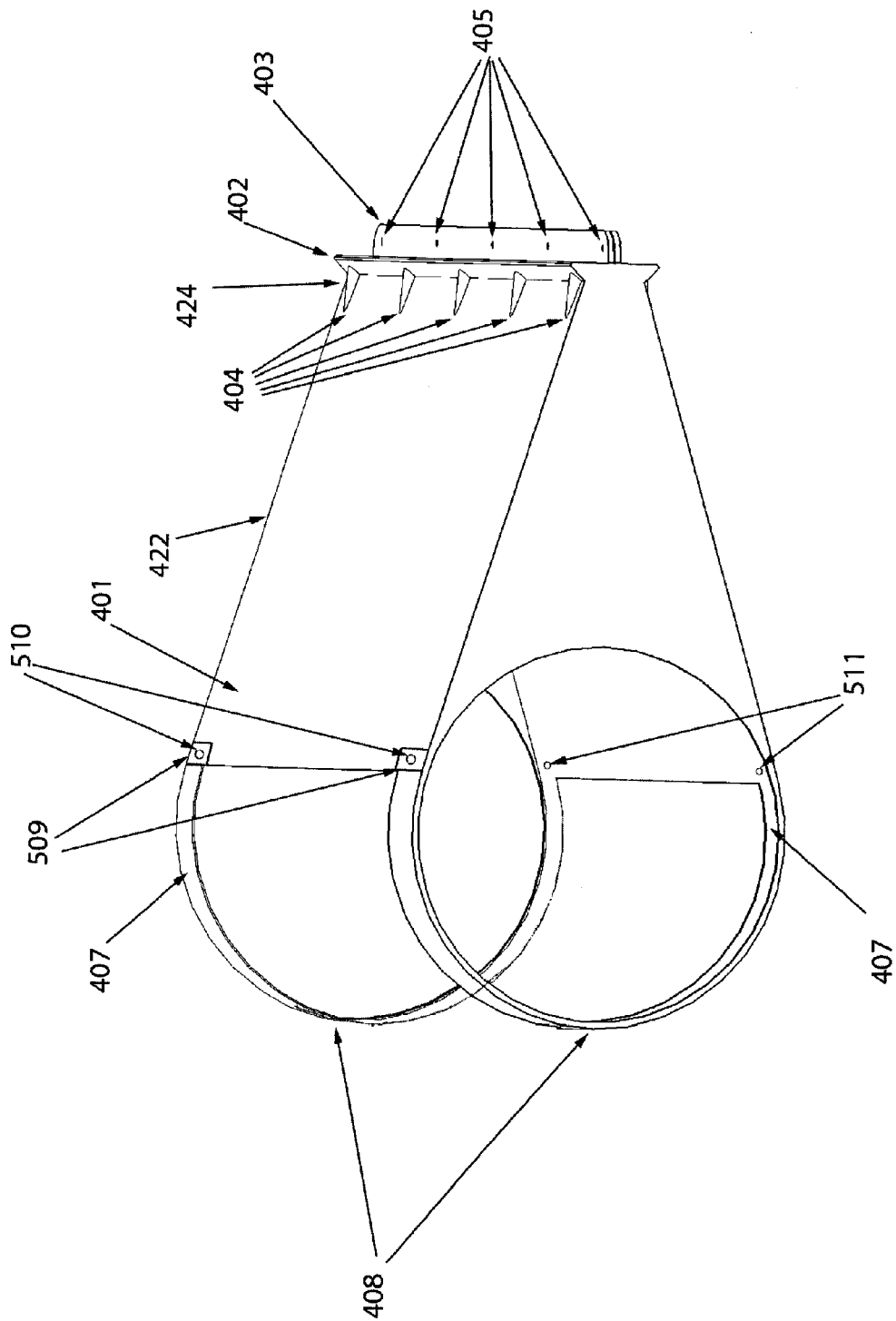
FIG. 5 illustrates a perspective view of another embodiment of a fairing.

FIG. 5 illustrates a perspective view of another embodiment of a fairing. Fairing 401, stabilizer 402 and flange 405 are substantially similar to the fairing, stabilizer and flange described in reference to FIG. 4 except that in this embodiment, straps 407 are made separate from fairing 401 and attached to fairing 401 with an optional bracket 509 and fasteners 510. In addition, since fairing 401 consists of only a tail portion 422 and end portion 424 and does not include a body portion that must encircle the tubular, fairing 401 need not include an opening that allows the fairing to be opened and closed around the tubular. Brackets 509 and fasteners 510 may be replaced with hinges on one side of fairing 401 so that the straps swing around the tubular and fasten on the other side to fairing 401 through optional brackets 509 and fasteners 510.

The descriptions for FIG. 1A and FIG. 1B including features, sizes, materials, fastening methods, and other variations apply to FIG. 5. Brackets 509 and fasteners 510 may be made of any suitable material including metals, plastics, fiberglass and other composites, and wood. Brackets 509 may be in place to provide support or to act as receptacles for straps 407. Straps 407 may have openings or bushings in their ends that slide into a receptacle (not shown).

Referring to FIG. 4 and FIG. 5, straps 407 may be inserted into a groove that is cut or placed in the outside of a tubular or structure and used to keep straps 407 from sliding axially along the tubular. In addition, straps 407 may have appurtenances that allow straps 407 to better interface with such grooves.

Figure 6:
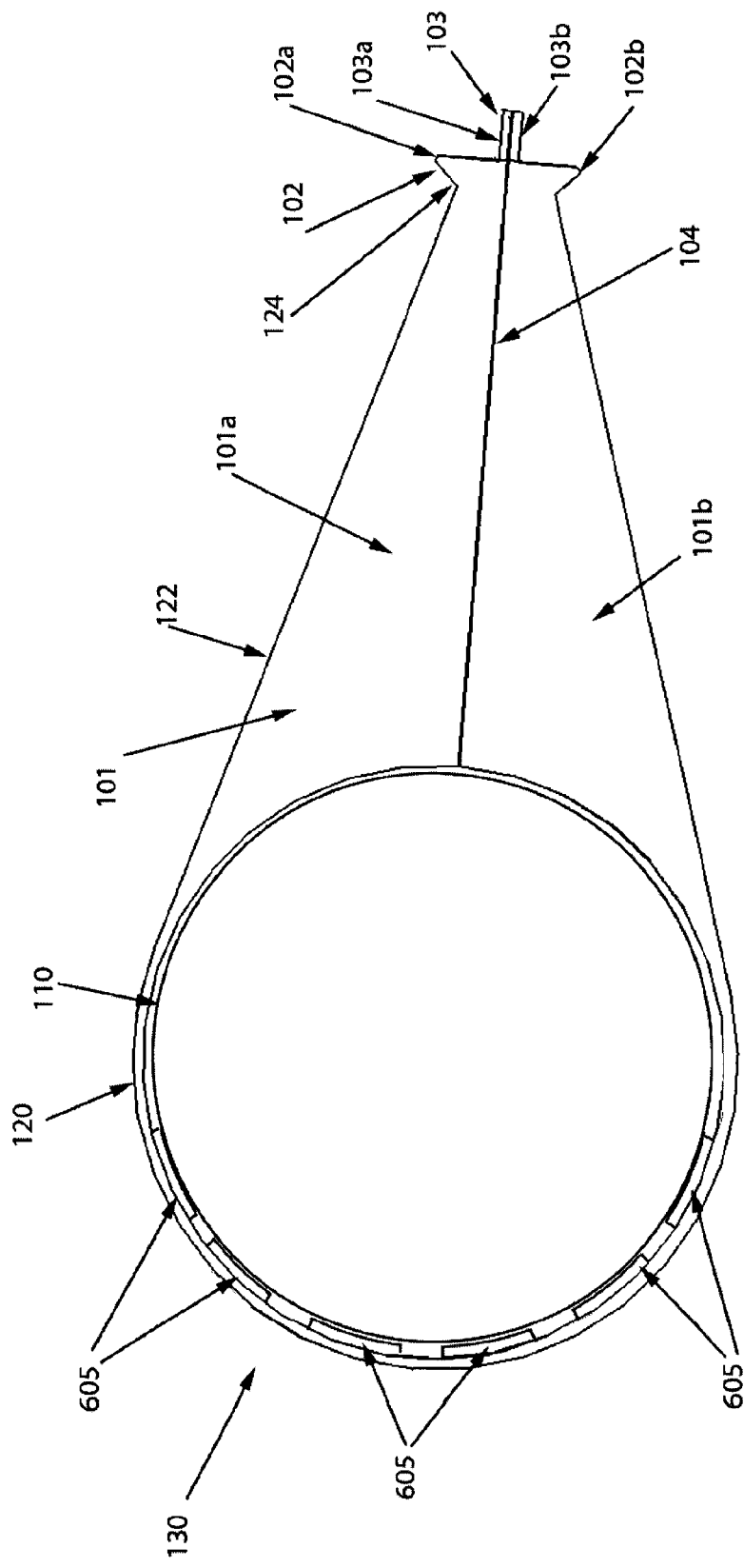
FIG. 6 illustrates a top view of another embodiment of a fairing.

FIG. 6 illustrates a top view of another embodiment of a fairing. Fairing 101, stabilizer 102 and flange 105 are substantially similar to the fairing, stabilizer and flange described in reference to FIG. 1A except that in this embodiment, an auxiliary stabilizing member in the form of weights 605 is attached to nose 130 of body portion 120. Weights 605 may be attached along an inner surface of body portion 120 of fairing 101 by any suitable technique, for example, an adhesive, chemical bonding or mechanical attachment means (e.g. bolts). Weights 605 may be of any size, shape and mass sufficient to move the center of mass of fairing 101 closer towards the center of rotation, which in turn reduces the ability of fairing 101 to flutter. Weights 605 may include several weights or a single weight. Weights 605 may be one or more strips along the fairing and tubular axis, or may be discrete units. Weights 605 may be distributed along the nose of the fairing or integrated into the nose material, and can also reside in other areas of the annulus or tail.

Figure 7:
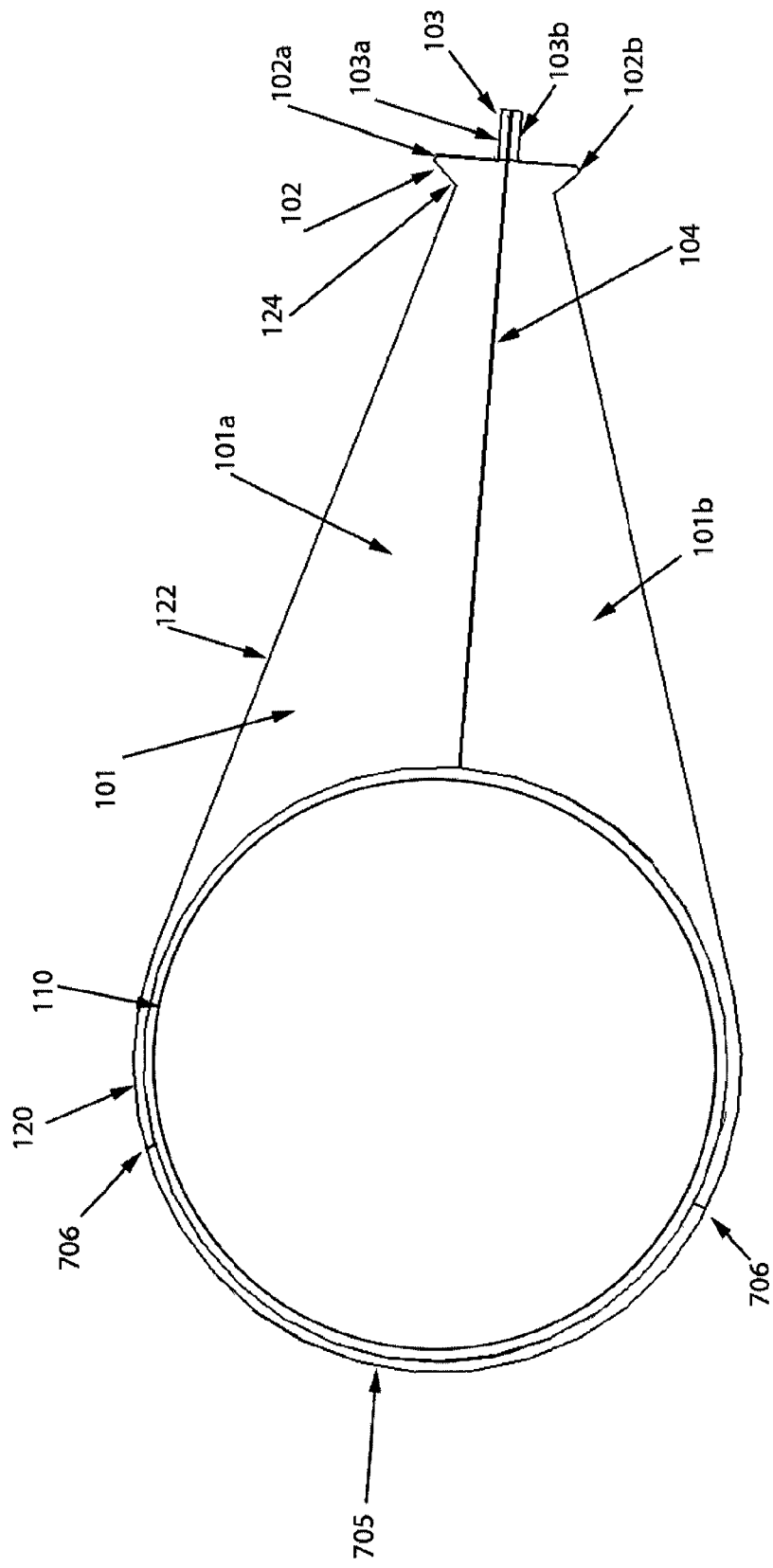
FIG. 7 illustrates a top view of another embodiment of a fairing.

Representatively, as illustrated in FIG. 7, weight 705 may form a substantial portion of nose 130 of fairing 101. In this aspect, fairing nose 130 may include a separate portion defined between points 706, which is made of weight 705 while the remainder of fairing 101 is made of another material having less mass. Alternatively, weight 705 may be of the same material as fairing tail 122, but with a larger material thickness so as to add weight or mass to the nose of fairing 101.

Weights 605, 705 may be made of copper, in which case they also restrict the growth or marine organisms that can foul the annulus and restrict the fairing's ability to weathervane with changes in current direction. In still further embodiments, weights 605, 705 may be made of other materials such as stainless steel, Inconel, lead, or other suitable metals including hybrid metals where more than one metal is present; plastic, fiberglass or other composite, structure; or any suitable material that adds mass or weight to the nose of fairing 101.

Figure 8:
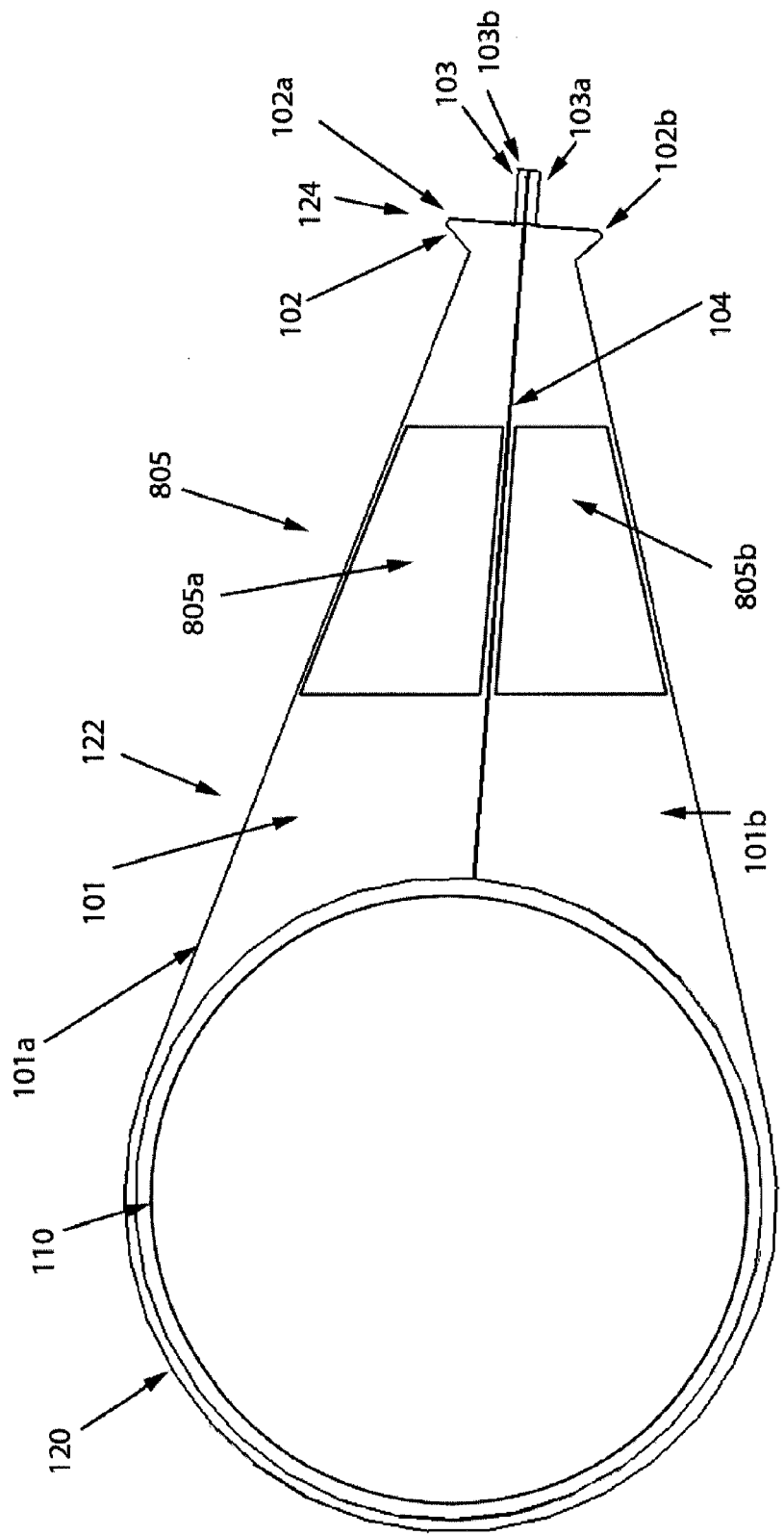
FIG. 8 illustrates a top view of another embodiment of a fairing.

FIG. 8 illustrates a top view of another embodiment of a fairing. Fairing 101, stabilizer 102 and flange 103 are substantially similar to the fairing, stabilizer and flange disclosed in reference to FIG. 1A, except that in this embodiment, an auxiliary stabilizing member in the form of insert 805 is incorporated into fairing tail portion 122 to provide added stability to fairing 101. Insert 805 may be of any size, shape or material sufficient to add buoyancy to fairing 101 and in turn, improve fairing stability. In particular, adding buoyancy to tail portion 122 moves the center of gravity of fairing 101 forward toward the nose 130, which makes it more difficult for tail portion 122 to flutter. In other words, instead of adding weight to nose 130 as previously discussed, improved stability may be achieved by subtracting weight from tail portion 122 using the buoyancy material. Alternatively, or in addition to adding buoyancy, insert 805 may be used to add stiffness to tail portion 122 of fairing 101.

For example, insert 805 may include first insert 805a and second insert 805b positioned within fairing first section 101a and fairing second section 101b, respectively. First and second inserts 805a and 805b may be lighter than the surrounding fluid to add buoyancy to fairing 101. Inserts 805a and 805b may be of any suitable geometry that allows them to remain inside of fairing 101. Representatively, fairing first section 101a and fairing second section 101b may be hollow structures and first and second inserts 805a and 805b may be secured (e.g. molded, adhered, bolted or the like) to the inner surface of the walls of each section, or first and second inserts 805a and 805b may be free to move within fairing 101. In addition, in embodiments where first and second inserts 805a and 805b are used to add stiffness to fairing 101, first and second inserts 805a and 805b may extend substantially along the height (along the tubular axis) of fairing 101.

It is further contemplated that in embodiments where fairing 101 is a tail fairing without body portion 120 (see FIG. 4 and FIG. 5), insert 805 may be a single structure, as opposed to two sections 805a, 805b, that can be incorporated into the hollow tail portion 122 as previously discussed. In particular, since the tail fairing can be positioned around the underlying tubular using associated straps, the tail fairing need not be divided into sections and in turn, insert 805 can be a single unit occupying a substantial volume within the tail portion 122.

Insert 805, including first and second inserts 805a and 805b may be made of syntactic foam, other foams, an air filled chamber, plastic, wood, or any material suitable for adding buoyancy to fairing 101. First and second inserts 805a, 805b may be identical in size, shape, attachment, and material composition, or they may be different in size, shape, attachment, and/or material composition. There may be any number of inserts, for example there may be two inserts, three inserts, four inserts, or any desired quantity.

Figure 9:
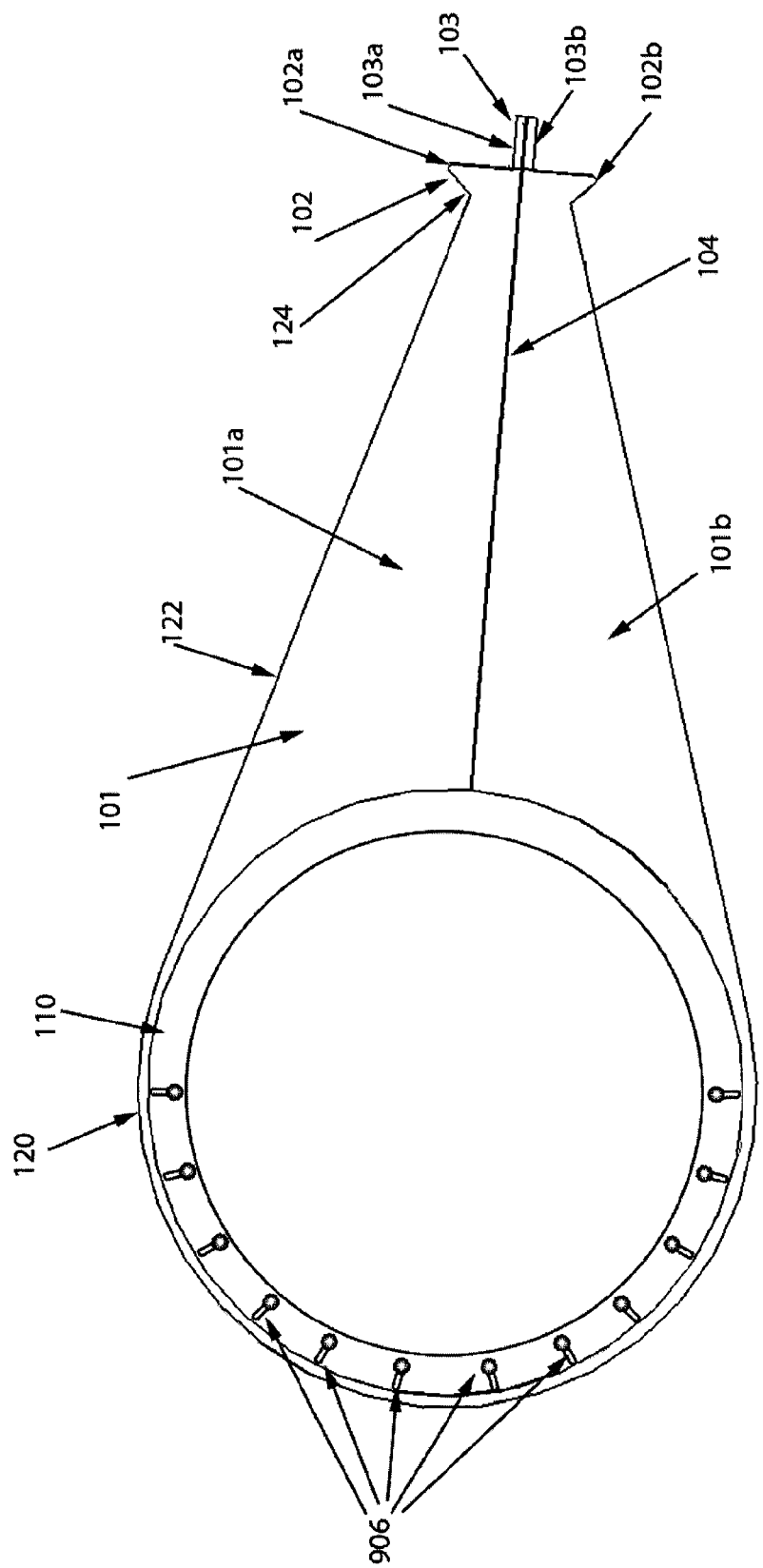
FIG. 9 illustrates a top view of another embodiment of a fairing.

FIG. 9 illustrates a top view of another embodiment of a fairing. Fairing 101, stabilizer 102 and flange 103 are substantially similar to the fairing, stabilizer and flange described in reference to FIG. 1A, except that in this embodiment, an auxiliary stabilizing member in the form of damping members 906 is attached to an annulus of fairing 101 to provide friction damping in the annulus. Although stabilizer 102 and flange 103 are illustrated, these features are optional and therefore may be omitted. For example, in embodiments where fairing 101 is a short fairing (e.g. chord to thickness ratio of 1.5 or less), stabilizer 102 and flange 103 could be omitted since drag due to misalignment of short fairing with current flow is minimal compared to the long chord fairings.

Damping members 906 may be composed of brushes, blades, scrapers, spring mounted protrusions that resist rotation of fairing 101, or any other suitable structure that increases the friction between fairing 101 and tubular 110 during rotation of fairing 101. Increasing the friction between fairing 101 and tubular 110 improves fairing stability about tubular 110 by slowing down the weathervaning action of fairing 101, thereby improving stability, since flutter requires fairly rapid rotation of fairing 101. Damping members 906 may, or may not, also be used for cleaning marine growth off of tubular 110.

Damping members 906 may be made of any suitable material, including: metals such as stainless steel, Inconel, copper, brass, or aluminum; thermoplastics such as PVC, ABS, and polyethylene; wood; fiberglass; or other composite or synthetic materials. Any number of damping members 906 suitable for slowing down the weathervaning action of fairing 101 may be used. In addition, damping members 906 may be positioned around the entire fairing annulus or less than the entire annulus.

In addition to, or instead of, attaching damping members 906 to tubular 910, damping members 906 may be attached to tubular 910 by any suitable means such as banding, clamping, welding, or attaching to an intermediate sleeve.

Figure 10:
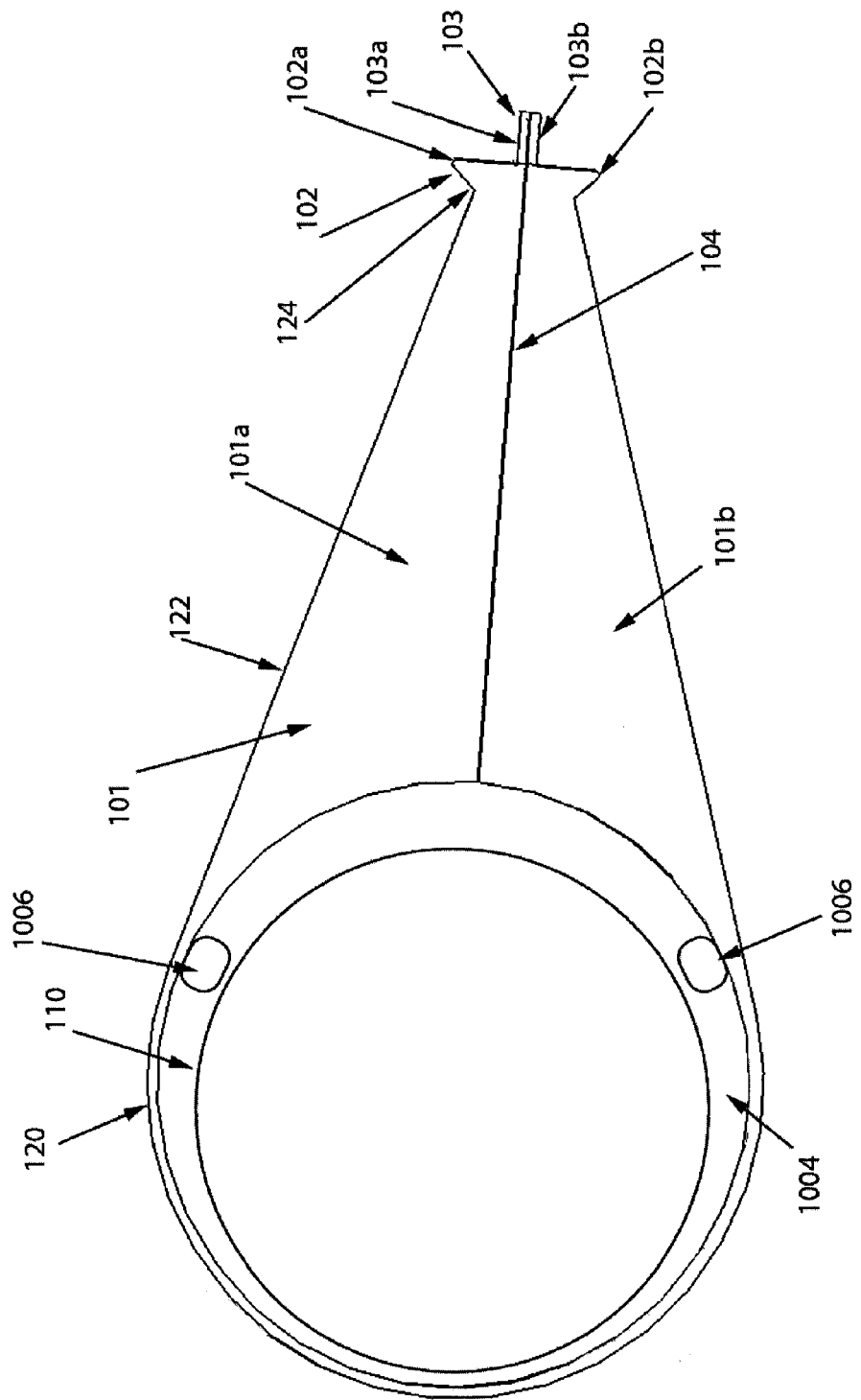
FIG. 10 illustrates a top view of another embodiment of a fairing.

In still further embodiments, as illustrated in FIG. 10, damping members 1006 may be attached within annulus 1004 along a side forming tail portion 122 of fairing 101. In this embodiment, damping members 1006 may be strategically placed and sized so that fairing 101 cannot smoothly rotate around tubular 110, rather fairing 101 rotates about two different centers of rotation in order to rotate a significant angular distance. In particular, fairings naturally want to weathervane around their nose. This is the center of rotation with the most freedom. For example, a fairing with an extremely large annulus would just roll/rotate around on its nose. By inserting the damping members 1006, fairing 101 has to also rotate about a center axis coincident with the center of the fairing or tubular in order experience significant flutter. As such, damping members 1006 are placed and sized in any manner sufficient to provide a larger annulus at the nose of the fairing than at the backside of the tubular. In addition, annulus 1004 may also be strategically sized to facilitate the effectiveness of damping members 1006, and may typically be a little larger than it would normally be sized without damping members 1006 in place.

Damping members 1006 may be of any quantity, size, shape, or location. Damping members 1006 can be on the tail side of the fairing or other areas of the fairing circumference. Damping members 1006 may also be attached to the tubular by any suitable means including: molding the protrusions into the collar material, chemical bonding, welding, mechanically fastening, or magnetic attachment.

Damping members 1006 may be made of any suitable material, including: metals such as stainless steel, Inconel, copper, brass, or aluminum; thermoplastics such as PVC, ABS, and polyethylene; wood; fiberglass; or other composite or synthetic materials. Fairing 101 and damping members 1006 may be made of the same material or may be made of different materials. For example, damping members 1006 may be made of the same material as fairing 101 and molded together as a single unit.

Figure 11:
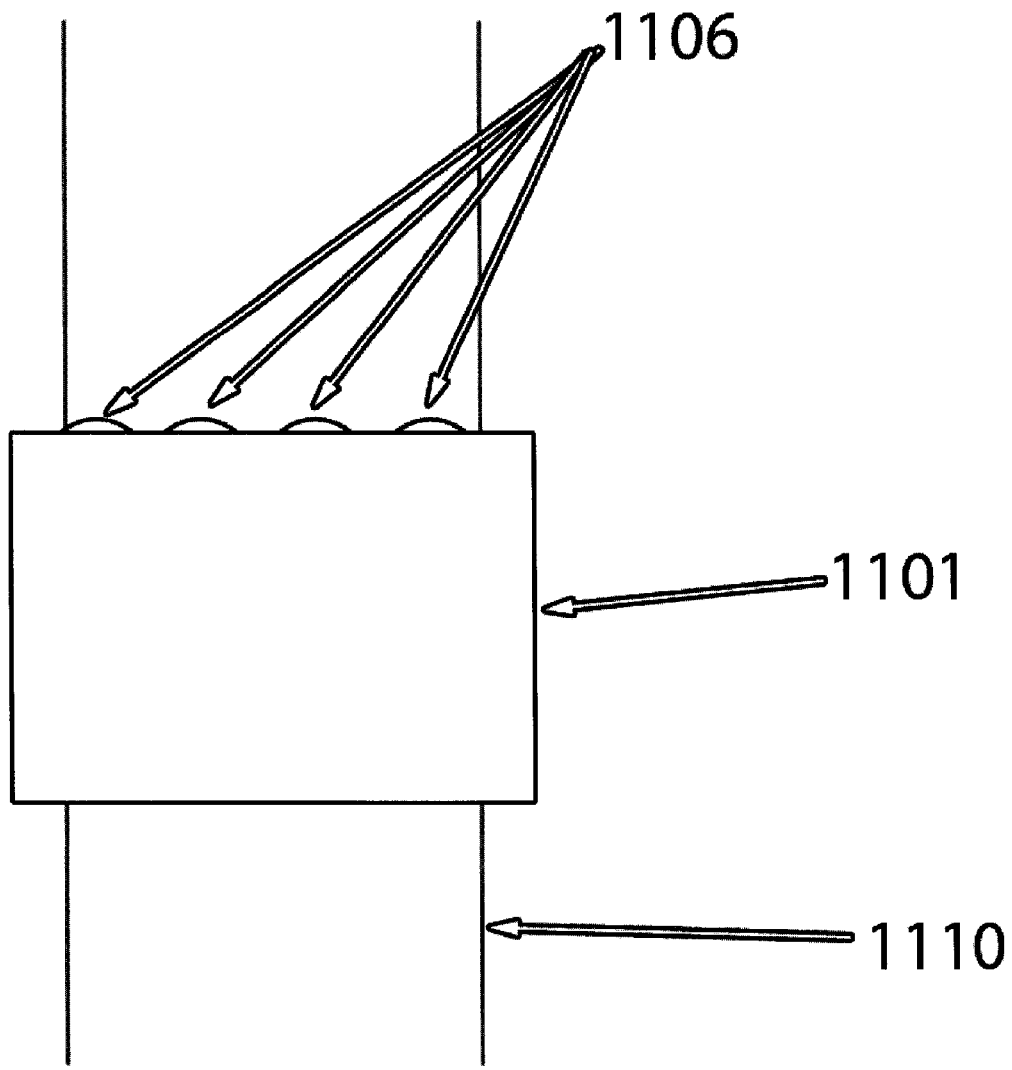
FIG. 11 illustrates a side view of an embodiment of a damping member.

Alternatively or additionally, damping members can be attached to a support structure adjacent to the fairing as illustrated in FIG. 11. In particular, FIG. 11 illustrates a side view of an embodiment in which damping members 1106 are positioned along the edge of collar 1101 that is used to axially position the fairing (e.g. fairing 901) along tubular 1110. Damping members 1106 may extend from the surface of collar 1101 along the length dimension of tubular 1110. By adding damping members 1106 to the collar surface, a fairing using collar 1101 as a bearing surface or adjacent to collar 1101 will need to slide over damping members 1106 in order to weathervane with changes in direction of the oncoming current. These damping members 1106 thus have the function of slowing down the weathervaning action of the fairing, thereby improving stability, since flutter requires fairly rapid rotation of the fairing.

In the embodiment illustrated in FIG. 11, damping members 1106 may be made of any size, shape, number, or density of coverage such as those previously discussed; however it is desirable to have them designed such that they provide ample resistance to fairing weathervaning but not too much resistance that prevents the fairing from weathervaning. In general they will be tapered up and down away from the collar surface so that the collar can readily slide over them without so much interference with the tubular that the tubular is no longer free to weathervane with changes in the oncoming current.

Damping members 1106 may be made of any suitable material, including: metals such as stainless steel, Inconel, copper, brass, or aluminum; thermoplastics such as PVC, ABS, and polyethylene; wood; fiberglass; or other composite or synthetic materials. Damping members 1106 may be attached to either the fairing or collar 1101, and may be attached by any suitable means including: molding the protrusions into the collar material, chemical bonding, welding, mechanically fastening, or magnetic attachment.

Figure 12:
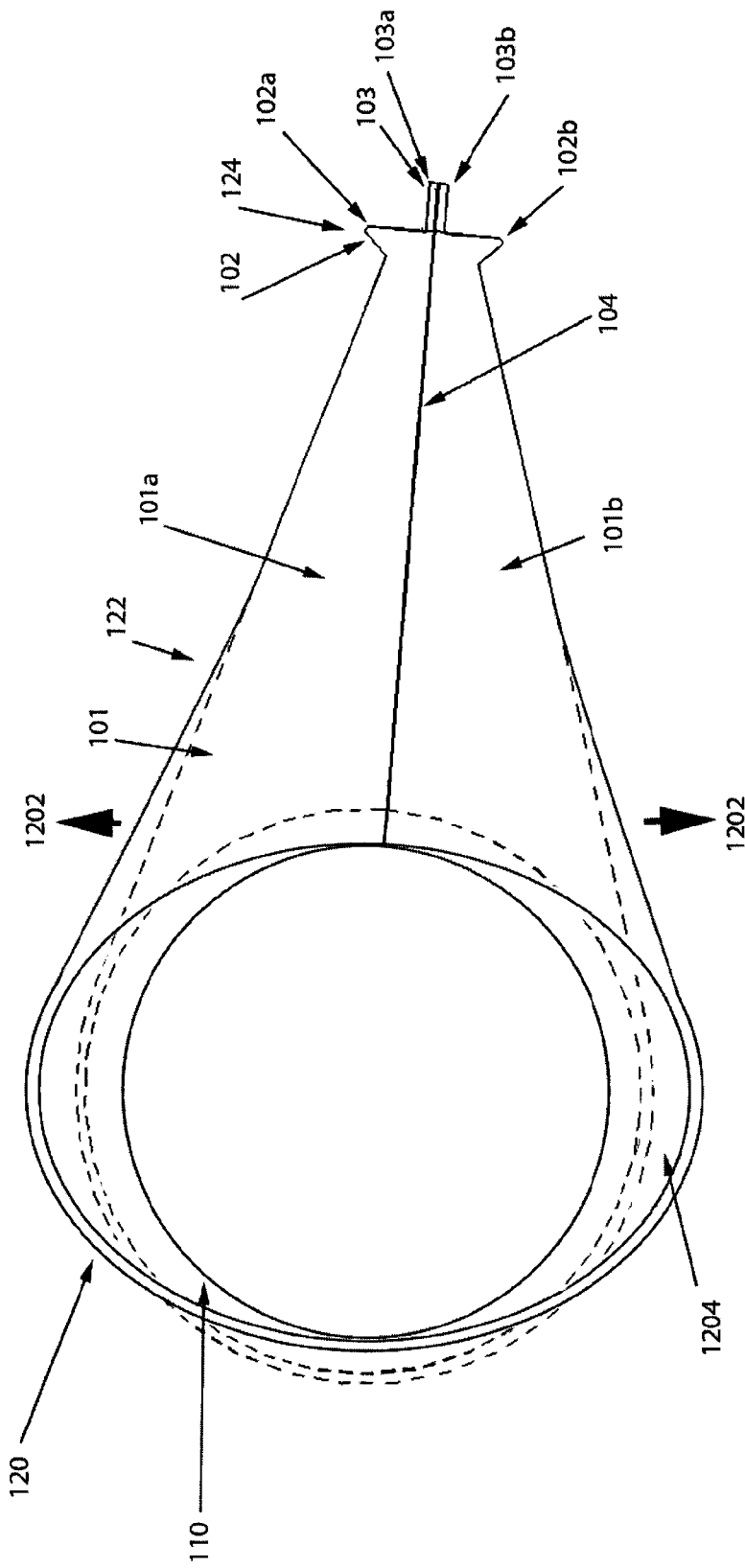
FIG. 12 illustrates a top view of another embodiment of a fairing.

FIG. 12 illustrates a top view of another embodiment of a fairing. According to this embodiment, a stability of fairing 101 about tubular 110 is improved by modifying a diameter of annulus 1204 so that portions of fairing 101 are tightened around tubular 110. Tightening fairing 101 around tubular increases friction between fairing and tubular 101 which, as previously discussed, reduces flutter. For example, in one embodiment, fairing 101 is made of a flexible material such that fairing 101 bows out in a direction of arrows 1202. When fairing 101 bows out in the direction of arrows 1202, annulus 1204 transforms from a substantially circular shape to a substantially elliptical shape as shown, causing opposing walls of annulus 1204 to contact tubular 101. This contact increases friction between fairing 101 and tubular 110 as fairing 101 weathervanes around tubular 110. As previously discussed, this increased friction has the effect of reducing fairing flutter. To achieve this effect, the flexibility of fairing 101 may be increased, by for example, reducing a thickness of the walls of fairing 101. Alternatively, or additionally, a size of the annulus of fairing 101 may be modified, for example, made smaller than a typical fairing annulus to ensure that fairing 101 impinges on tubular 110. It is contemplated, however, that the annulus may be made smaller or larger depending upon the level of current. Still further, fairing 101 may be made of a more flexible material, for example, a rubber material.

Figure 13:
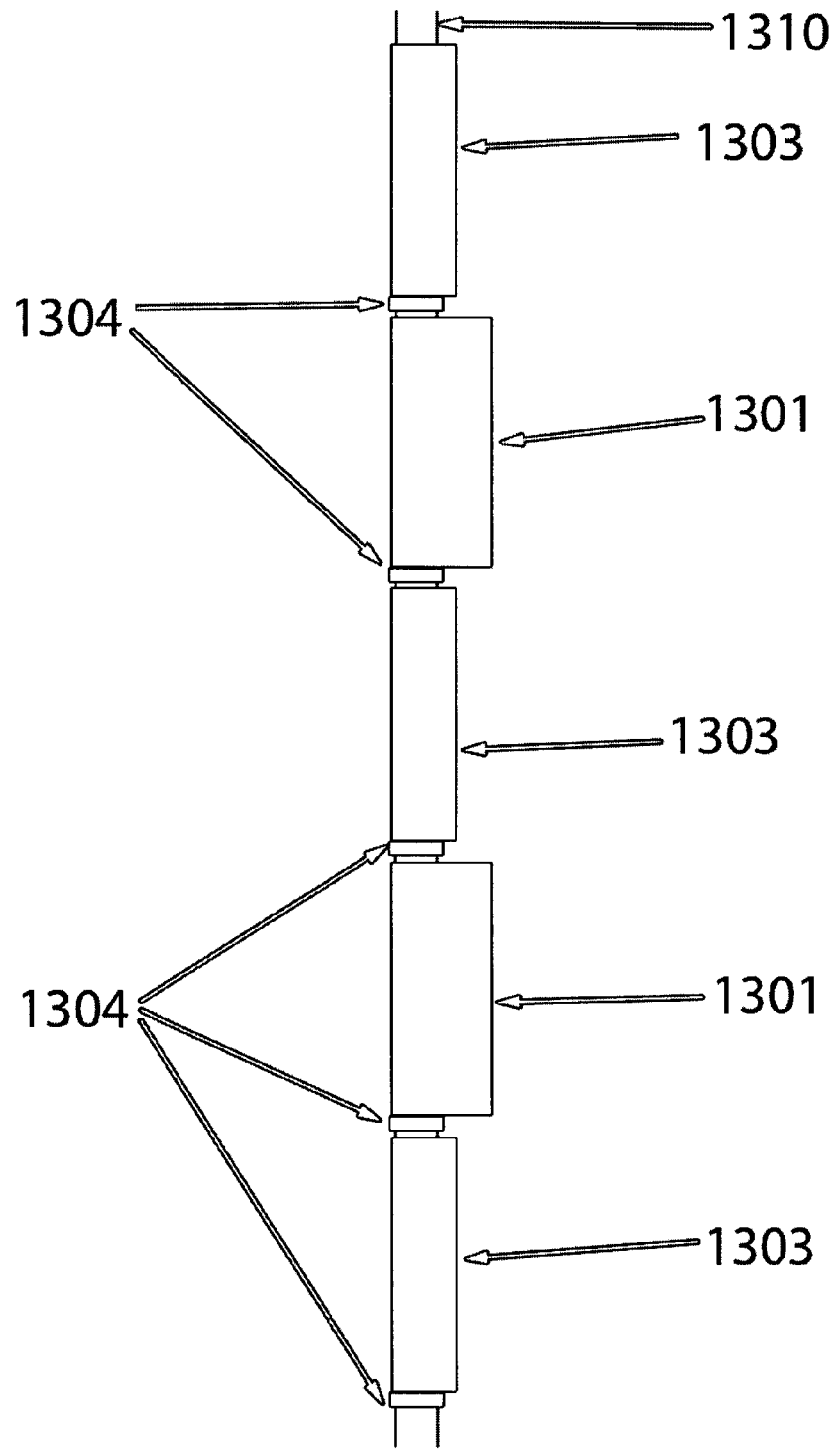
FIG. 13 illustrates a side view of a plurality of VIV suppression devices installed along a tubular structure.

FIG. 13 illustrates an embodiment of the fairing and collar positioned about a tubular. As previously discussed, collars 1304 can be used to axially position fairings 1301, 1303, or other VIV suppression devices, about a tubular 1310. To achieve the most effective VIV suppression, in some embodiments, different types of fairings 1301, 1303 may be positioned about tubular 1310. For example, long chord-to-thickness ratio fairings 1301 can be constrained axially about tubular 1310 by collars 1304, which are clamped tightly to tubular 1310. Adjacent to long chord-to-thickness ratio (long chord) fairings 1301 and associated collars 1304 are short chord-to-thickness ratio (short chord) fairings 1303. Thus, the long chord fairings 1301 and the short chord fairings 1303 are alternating between collars 1304. By alternating more stable short chord fairings 1303 with long chord fairings 1301, the overall system becomes more stable. The collars 1304 are optional, and may have more or few than what is shown in FIG. 13, or may not even be present at all. In addition, any number of long chord fairings 1301 may be present in any give segment of fairings (a segment is a length of fairings and collars with the fairings all having approximately the same chord length), and similarly any number of short chord fairings 1301 may be present in any give segment of fairings. Various chord lengths of fairings may be used for the various segments (that is, more than two different chord lengths of fairings may be used along the tubular). Fairings 1301 and 1302 may be substantially similar to and have any of the previously described features, including stabilizing fin members, flanges or auxiliary stabilizers such as auxiliary fins, weights or damping members.

Figure 14:
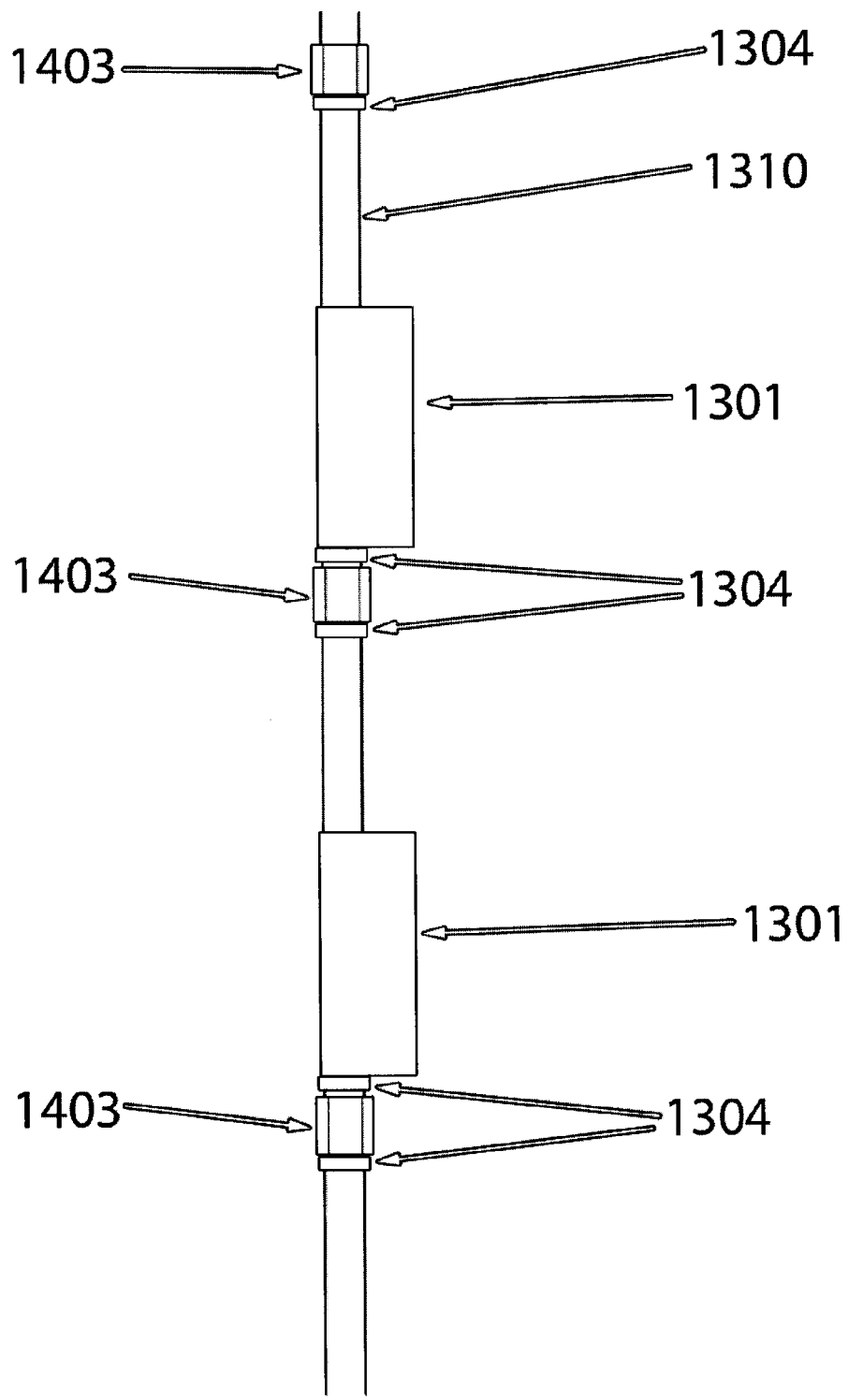
FIG. 14 illustrates a side view of a plurality of VIV suppression devices installed along a tubular structure.

In still further embodiments, in addition to fairings, other types of VIV suppression devices may be positioned along the tubular to improve the stability of the suppression system. For example, as illustrated in FIG. 14, fairings 1301 may be alternately positioned along tubular 1301 with VIV suppression devices 1403, and axially constrained by collars 1304. It is noted that although fairings 1301 were previously described as long chord fairings, fairings having any chord length, such as short chord fairings, may also be used. In some embodiments VIV suppression devices 1403 may be multiple sided VIV suppression devices which have been found to perform well at lower coverage densities than fairings. For example, devices having a polygonal cross-sectional profile, e.g. a square or rectangle, or cylindrical shaped device with blades. Still further VIV suppression devices 1403 may be helical strake devices.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. For example, although long chord fairings are primarily described, it is contemplated that the above described stabilizers, flanges, straps and/or auxiliary stabilizers may be incorporated into short fairings or other similar VIV suppression devices. In addition, the fairings described above may include secondary structures such as supports, support blocks, anodes, marine growth protections such as copper or coatings, and other equipment. The specification and drawings are, accordingly, to be regarded in an illustrative rather than a restrictive sense.

What is claimed is:

1. An apparatus comprising:
   a fairing operable to suppress a vortex-induced vibration of a tubular, the fairing having a body portion and a tail portion that tapers from the body portion to an end portion, the body portion defining an annulus dimensioned to encircle a tubular, wherein the annulus has a modifiable diameter; and
   a stabilizing member dimensioned to stabilize the fairing along a tubular positioned within the annulus, wherein the stabilizing member is formed by opposing walls of the annulus, and wherein the opposing walls are operable to move toward one another as the diameter is modified to tighten the annulus around a tubular encircled by the annulus.

2. The apparatus of claim 1 wherein the stabilizing member is dimensioned to contact an outer surface of the tubular so as to increase friction between the fairing and the tubular when the fairing rotates around the tubular.

3. The apparatus of claim 1 wherein the stabilizing member further comprises a first damping member and a second damping member, wherein the first damping member and the second damping member extend from a side of the annulus near the tail portion.

4. The apparatus of claim 1 wherein the annulus comprises a first configuration in which the opposing walls are a first distance from one another and a second configuration in which the opposing walls are a second distance from one another, the second distance being shorter than the first distance such that the opposing walls contact the tubular.

5. The apparatus of claim 1 wherein the diameter of the annulus is modifiable between a first configuration in which the annulus has a circular shape and a second configuration in which the annulus has an elliptical shape.

6. An apparatus comprising:
   a fairing operable to suppress a vortex-induced vibration of a tubular, the fairing having a body portion defining an annulus dimensioned to completely encircle a tubular; and
   a damping member extending radially inward from the annulus, wherein the damping member is a brush dimensioned to contact an outer surface of a tubular positioned within the annulus.

7. The apparatus of claim 6 wherein the brush is dimensioned to (1) provide friction damping between the tubular and the fairing during rotation of the fairing about the tubular or (2) clean marine growth off of the tubular during rotation of the fairing about the tubular.

8. The apparatus of claim 6 wherein the damping member is positioned along only one side of the annulus such that the damping member changes a center of rotation of the fairing about the tubular.

9. The apparatus of claim 6 wherein the damping member is integrally formed with the body portion as a single unit.

10. An apparatus comprising:
    a fairing operable to suppress a vortex-induced vibration of a tubular, the fairing having a body portion defining an annulus dimensioned to completely encircle a tubular; and
    a damping member extending radially inward from the annulus, the damping member being dimensioned to contact an outer surface of a tubular positioned within the annulus, and wherein the damping member is positioned along only one side of the annulus such that the damping member changes a center of rotation of the fairing about a tubular encircled by the annulus.

* * * * *